(12) United States Patent
Lin et al.

(10) Patent No.: US 11,245,476 B2
(45) Date of Patent: Feb. 8, 2022

(54) HIGHLY ROBUST UNDERWATER OPTICAL COMMUNICATION SYSTEM

(71) Applicant: DALIAN UNIVERSITY OF TECHNOLOGY, Liaoning (CN)

(72) Inventors: Chi Lin, Liaoning (CN); Yongda Yu, Liaoning (CN); Yichuan Zhang, Liaoning (CN); Lei Wang, Liaoning (CN); Guowei Wu, Liaoning (CN); Zhehuan Zhao, Liaoning (CN); Zhongxuan Luo, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/257,793

(22) PCT Filed: May 11, 2020

(86) PCT No.: PCT/CN2020/089614
§ 371 (c)(1),
(2) Date: Jan. 4, 2021

(87) PCT Pub. No.: WO2021/109453
PCT Pub. Date: Jun. 10, 2021

(65) Prior Publication Data
US 2021/0336705 A1    Oct. 28, 2021

(30) Foreign Application Priority Data
Dec. 2, 2019  (CN) .......................... 201911213804.9

(51) Int. Cl.
*H04B 10/61*   (2013.01)
*H04B 10/50*   (2013.01)
*H04B 10/516*  (2013.01)

(52) U.S. Cl.
CPC ....... *H04B 10/6151* (2013.01); *H04B 10/502* (2013.01); *H04B 10/504* (2013.01); *H04B 10/516* (2013.01); *H04B 10/6163* (2013.01)

(58) Field of Classification Search
CPC .......... H04B 10/6164; H04B 10/25073; H04B 10/6165; H04B 10/6161; H04B 10/64
(Continued)

(56) References Cited

U.S. PATENT DOCUMENTS 9,825,713 B2 *  11/2017  Hopewell ........... H04L 27/2601
10,263,711 B2 *  4/2019  Lacovara ............... H04B 13/02
(Continued)

FOREIGN PATENT DOCUMENTS

CN    102098112 A    6/2011
CN    102404051 A    4/2012
(Continued)

*Primary Examiner* — Abbas H Alagheband
(74) *Attorney, Agent, or Firm* — Muncy, Geissler, Olds & Lowe, P.C.

(57) ABSTRACT

The present invention belongs to the technical field of underwater communication, and provides a novel highly robust underwater optical communication system which comprises a sending module and a receiving module. The novel highly robust underwater optical communication system realizes highly robust underwater optical communication under strong interference of sunlight and artificial light sources. The system uses a new physical method irrelevant to frequency, and can be used with existing MIMO and CDMA to obtain better communication effects. The circularly polarized light is used for signal transmission, thereby avoiding the problem of channel misalignment caused by the rotation of a platform underwater. At the same time, good polarization maintaining of a marine environment makes the signal characteristics difficult to lose.

8 Claims, 3 Drawing Sheets

(58) Field of Classification Search
USPC .......................................................... 398/208
See application file for complete search history.

(56) References Cited

U.S. PATENT DOCUMENTS

| | | | | |
|---|---|---|---|---|
| 10,333,629 | B2* | 6/2019 | Lacovara | H04B 10/503 |
| 10,677,946 | B2* | 6/2020 | Morris | G01V 1/3852 |
| 10,955,327 | B2* | 3/2021 | Trainer | G01N 21/53 |
| 11,025,346 | B2* | 6/2021 | Ooi | H04B 10/807 |
| 2003/0053397 | A1* | 3/2003 | Katayama | G11B 7/1365 |
| | | | | 369/112.17 |
| 2018/0120424 | A1* | 5/2018 | Eshel | G01S 17/04 |
| 2019/0212450 | A1* | 7/2019 | Steinberg | G01S 17/42 |

FOREIGN PATENT DOCUMENTS

| | | |
|---|---|---|
| CN | 102916744 A | 2/2013 |
| CN | 110113110 A | 8/2019 |
| CN | 110995357 A | 4/2020 |
| JP | 2013005327 A | 1/2013 |

* cited by examiner

HIGHLY ROBUST UNDERWATER OPTICAL COMMUNICATION SYSTEM

TECHNICAL FIELD

The present invention belongs to the technical field of underwater communication, and particularly relates to a novel highly robust underwater optical communication system.

BACKGROUND

The underwater wireless communication technology is a key technology for building an underwater sensor network and realizing information collection and transmission. The exploration of high-speed and effective underwater wireless communication technology is important to the establishment and normal operation of an underwater sensor network system. An underwater visible light communication technology transmits information using high-speed bright and dark flashing signals that cannot be recognized by the naked eyes and issued by light emitting diodes, has the characteristics of high bandwidth, low delay, small volume and low power consumption, and can be effectively applied to the scenario of short-distance underwater communication. In recent years, underwater optical communication systems have become a research hotspot, have made certain progress in the fields of anti-interference, robustness and high-bandwidth transmission, and have been regarded as the optimal solution for underwater short-distance, high-bandwidth and low-delay communication. However, at present, the problem of poor anti-interference still exists in underwater optical communication. In the process of underwater communication, under the effects of absorption and scattering of environmental water bodies, plankton, organic matter and suspended particles, different degrees of interference are generated for light waves, thereby attenuating light intensity, greatly affecting the quality of optical communication and causing extremely high error rate. In addition, ambient light (natural light and artificial light) also greatly affects the underwater optical communication. A high-bandwidth and low-delay underwater optical communication system that can be used in complex environments is urgently needed, so as to achieve high-speed information transmission.

SUMMARY

To satisfy the needs in the background, the present invention provides a highly robust underwater optical communication system.

The technical solution of the present invention is as follows:

A novel highly robust underwater optical communication system comprises a sending module and a receiving module.

The sending module comprises a lens group 1, an optical receiver 2, a differential amplifier 3, a comparator 4 and an embedded microcontroller unit 5; during signal reception, an optical signal passing through an environmental channel passes through the lens group 1; the lens group 1 separates reference light from signal light; two lights respectively enter the corresponding receiver 2; the receiver 2 converts an optical analog signal into an electrical analog signal; two electrical analog signals are inputted into the differential amplifier 3; after the signal light and the reference light are differentially amplified, a differential signal is sent into the comparator 4; the comparator 4 converts the analog signals into digital signals; the digital signals are inputted into the embedded microcontroller unit 5, and finally decoded to obtain target data.

The receiving module comprises the embedded microcontroller unit 5, a signal inverter 6, high-power LED modulation circuits 7, a high-power LED 8 and the lens group 1; when the system sends the signals, the embedded microcontroller unit 5 groups the information to be sent, and then encodes the grouped information; the encoded information is sent into the signal inverter 6; the signal inverter 6 respectively outputs a positive phase signal and a reverse phase signal to two corresponding high-power LED modulation circuits 7; the high-power LED modulation circuits 7 modulate the high-power LED 8 to convert the digital signals into optical signals; the light emitted by the high-power LED 8 passes through the lens group 1; and the omnidirectional signal light is converted into linearly polarized light, and the linearly polarized light is converted into circularly polarized light and transmitted into the environment.

The lens group 1 comprises a polarizer 9 and a quarter wave plate 10; during signal transmission, the signal light passes through the polarizer 9 to convert the omnidirectional light into linearly polarized light, and then convert the linearly polarized light into circularly polarized light through the quarter wave plate 10; during signal reception, the circularly polarized light with signals passes through the quarter wave plate 10 to convert the circularly polarized light into the linearly polarized light; the converted light passes through the polarizer 9; and the polarizer 9 filters out signals of ambient light and an orthogonal channel, and retains the optical signal of the channel.

The optical receiver 2 is used to receive visible light in a wave band of 400-760 nm and convert the visible light into an analog quantity.

In a sending mode, the embedded microcontroller unit 5 encodes the data, and inputs a digital quantity into the signal inverter 6; the signal inverter 6 outputs the positive phase signal and the reverse phase signal; and in a receiving mode, the embedded microcontroller unit 5 receives the digital signals transmitted by the comparator 4 and decodes the digital signals to obtain target data.

The output power of the high-power LED 8 is 30 W, which meets the switching rate of 10 MHz.

The encoding adopts a differential mode to remove signal interference; two channels for encoding respectively encode the signals clockwise and counterclockwise; and two signals have the same amplitude and opposite phases. The method can more accurately identify the signals and remove ambient light interference.

The beneficial effects of the present invention are: the system of the present invention provides a highly robust underwater optical communication system, which realizes highly robust underwater optical communication under strong interference of sunlight and artificial light sources. The system uses a new physical method irrelevant to frequency, and can be used with existing MIMO and CDMA to obtain better communication effects. The circularly polarized light is used for signal transmission, thereby avoiding the problem of channel misalignment caused by the rotation of a platform underwater. At the same time, good polarization maintaining of a marine environment makes the signal characteristics difficult to lose.

In the figures: 1 lens group; 2 optical receiver; 3 differential amplifier; 4 comparator; 5 embedded microcontroller unit; 6 signal inverter; 7 high-power LED modulation circuit; 8 high-power LED; 9 polarizer; 10 quarter wave plate; 11 sending module; 12 receiving module. In the encoded schematic diagrams, FIG. (a) and FIG. (b) are encoded schematic diagrams of a sending end; in the codes, the circle is clockwise (counterclockwise) circularly polarized light; and FIG. (c) and FIG. (d) are schematic diagrams of differential communication principles.

DETAILED DESCRIPTION

Specific embodiments of the present invention are further described below in combination with the technical solutions and the drawings of description.

Figure 1:
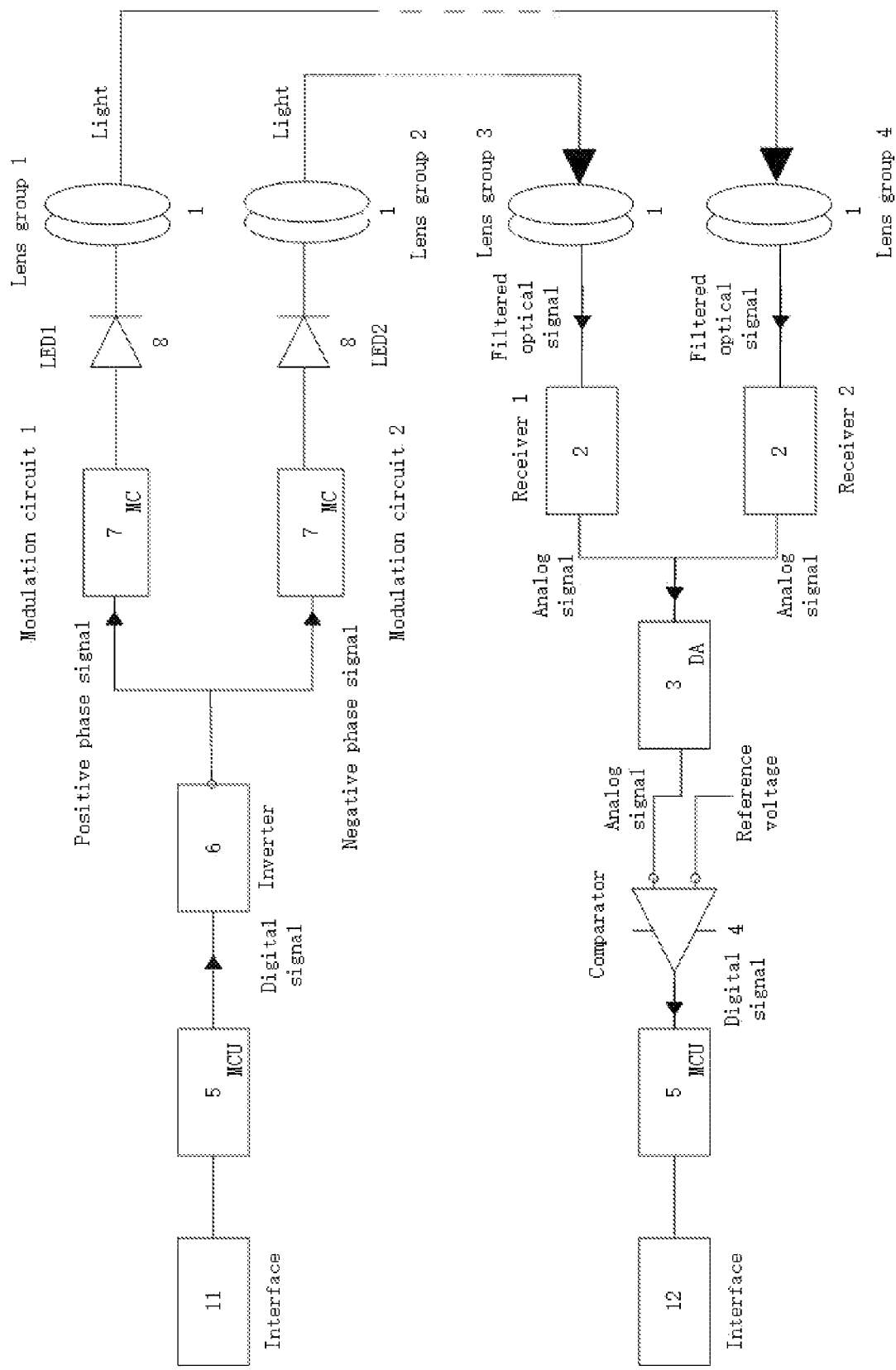
FIG. 1 is a system flow chart of the system.
Figure 2:
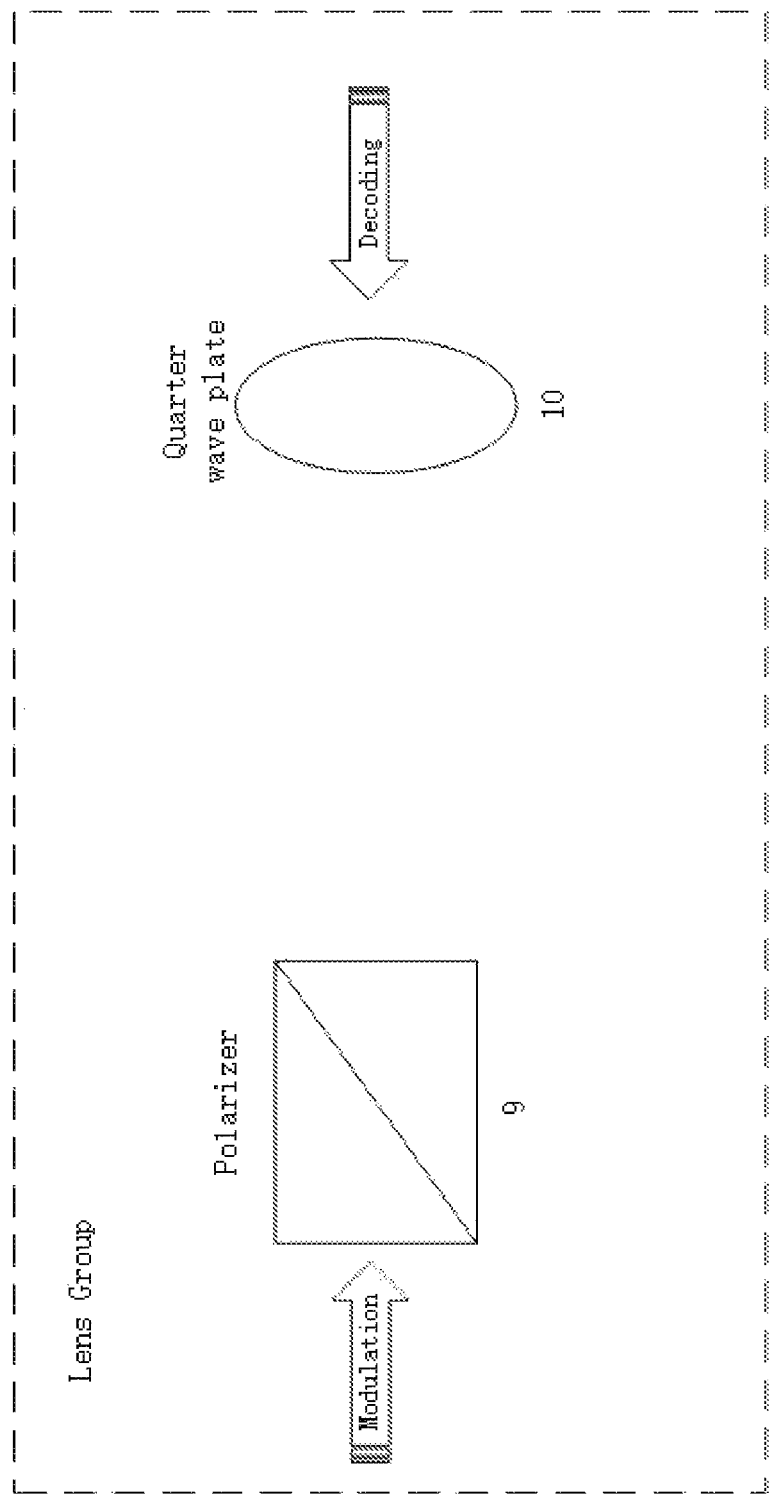
FIG. 2 is a schematic diagram of a lens group of the system.
Figure 3:
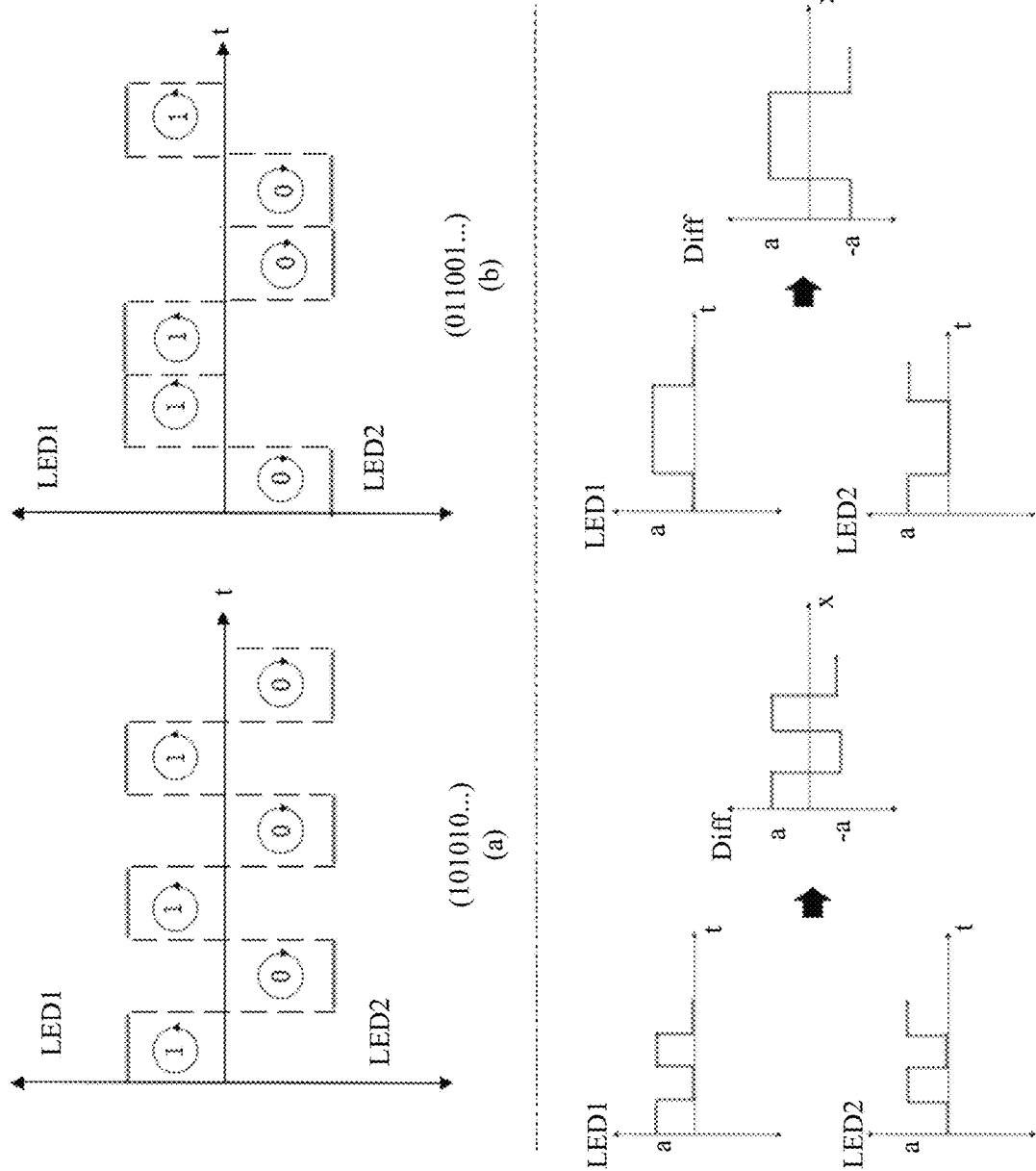
FIG. 3 is a schematic diagram of encoding and transmission of the system.

As shown in FIG. 2, when the system sends the signals, the embedded microcontroller unit groups the information to be sent, and then encodes the grouped information; the encoded information is sent into the signal inverter 6; the signal inverter 6 respectively outputs the positive phase signal and the reverse phase signal to two modulation circuits 7; the modulation circuits modulate the high-power LED 8 to convert the digital signals into optical signals; the light emitted by the high-power LED 8 passes through the lens group 1; and the omnidirectional signal light is converted into linearly polarized light, and the linearly polarized light is converted into circularly polarized light and transmitted into the environment.

During signal reception, an optical signal passing through an environmental channel passes through the lens group 1; the lens group 1 separates reference light from signal light; two lights respectively enter the corresponding receiver 2; the signal receiver converts an optical analog signal into an electrical analog signal; two analog signals are inputted into a high-speed differential amplifier 3; the signal light and the reference light are differentially amplified; a differential signal is sent into a high-speed comparator 4; the high-speed comparator converts the analog signals into digital signals; the digital signals are inputted into the embedded microcontroller unit, and finally decoded to obtain target data.

The invention claimed is:

1. A novel highly robust underwater optical communication system, comprising a sending module and a receiving module,
wherein the sending module comprises an embedded microcontroller unit, a signal inverter, high-power LED modulation circuits, a high-power LED and a lens group; when the sending module receives information to be sent, the embedded microcontroller unit encodes the information to be sent to the signal inverter as grouped encoded information; the signal inverter respectively outputs a positive phase signal and a reverse phase signal to two corresponding high-power LED modulation circuits; the high-power LED modulation circuits modulate the high-power LED to convert digital signals into optical signals; the optical signals emitted by the high-power LED passes through the lens group; and an omnidirectional signal light is converted into linearly polarized light, and the linearly polarized light is converted into circularly polarized light and transmitted into an environment channel;

the receiving module comprises a lens group, two optical receivers, a differential amplifier, a comparator and an embedded microcontroller unit; during signal reception, an optical signal passes through the environmental channel and then through the lens group; the lens group separates reference light from signal light; the two lights respectively enter the corresponding optical receivers; the respective optical receivers converts two light analog signals into two electrical analog signals; the two electrical analog signals are inputted into the differential amplifier; after the two electrical analog signals are differentially amplified, a differential signal output is sent to the comparator; the comparator converts the two electrical analog signals into two digital signals; the two digital signals are inputted to the embedded microcontroller unit, and finally the two digital signals are decoded to obtain target data;

the lens group of the sending module and the lens group of the receiving module each comprise a polarizer and a quarter wave plate;

during signal transmission, the signal light passes through the polarizer of the sending module to convert the omnidirectional light into linearly polarized light, and then convert the linearly polarized light into the circularly polarized light through the quarter wave plate of the sending module; and during signal reception, the circularly polarized light with signals passes through the quarter wave plate of the receiving module to convert the circularly polarized light into the linearly polarized light; the converted linearly polarized light passes through the polarizer of the receiving module; and the polarizer of the receiving module filters out the reference light and the signal light.

2. The novel highly robust underwater optical communication system according to claim 1, wherein the optical receiver is used to receive visible light in a wave band of 400-760 nm and convert the visible light into an analog quantity.

3. The novel highly robust underwater optical communication system according to claim 1, wherein in a sending mode, the embedded microcontroller unit encodes the target data, and inputs a digital quantity into the signal inverter; the signal inverter outputs the positive phase signal and the reverse phase signal; and in a receiving mode, the embedded microcontroller unit receives the digital signals transmitted by the comparator and decodes the digital signals to obtain target data.

4. The novel highly robust underwater optical communication system according to claim 1, wherein an output power of the high-power LED is 30 W, which meets a switching rate of 10 MHz.

5. The novel highly robust underwater optical communication system according to claim 2, wherein an output power of the high-power LED is 30 W, which meets a switching rate of 10 MHz.

6. The novel highly robust underwater optical communication system according to claim 1, wherein encoding adopts a differential mode to remove signal interference; two channels for encoding respectively encode the signals clockwise and counterclockwise; and two signals have the same amplitude and opposite phases.

7. The novel highly robust underwater optical communication system according to claim 2, wherein encoding adopts a differential mode to remove signal interference; two channels for encoding respectively encode the signals clockwise and counterclockwise; and two signals have the same amplitude and opposite phases.

8. The novel highly robust underwater optical communication system according to claim 3, wherein encoding adopts a differential mode to remove signal interference; two channels for encoding respectively encode the signals clockwise and counterclockwise; and two signals have the same amplitude and opposite phases.

* * * * *